United States Patent [19]

Signorelli

[11] Patent Number: 5,569,089
[45] Date of Patent: Oct. 29, 1996

[54] UNIVERSAL JOINT CONSTRUCTION

[76] Inventor: Richard L. Signorelli, 43 Sherwood Dr., Torrington, Conn. 06790

[21] Appl. No.: 144,302

[22] Filed: Oct. 28, 1993

[51] Int. Cl.$^6$ ..................................................... F16D 3/16
[52] U.S. Cl. .......................... 464/112; 464/147; 464/905
[58] Field of Search ..................................... 464/106, 112, 464/147, 152, 904, 906, 144; 403/114, 122, 123, 125

[56] References Cited

U.S. PATENT DOCUMENTS

| | | | |
|---|---|---|---|
| 1,436,785 | 11/1922 | Thiemer | 464/905 X |
| 1,440,648 | 1/1923 | Thiemer | 464/905 X |
| 1,625,410 | 4/1927 | De Ram | 464/905 X |
| 2,140,295 | 12/1938 | Mallard | 464/152 |
| 2,234,296 | 3/1941 | Wollner | 464/905 X |
| 2,441,347 | 5/1948 | Dodge | 464/905 X |
| 2,923,141 | 2/1960 | Simonds | 464/905 X |
| 3,125,870 | 3/1964 | Orain | 464/111 |
| 3,392,548 | 7/1968 | Meyer | 464/905 X |
| 3,818,721 | 6/1974 | Wahlmark . | |
| 3,965,701 | 6/1976 | Orain | 464/144 |
| 3,990,267 | 11/1976 | Orain . | |
| 4,091,641 | 5/1978 | Welschof . | |
| 4,175,407 | 11/1979 | Orain . | |
| 4,421,494 | 12/1983 | Futamura et al. . | |
| 4,516,957 | 5/1985 | Chyz et al. . | |
| 4,541,819 | 9/1985 | Mazziotti | 464/144 |
| 4,693,698 | 9/1987 | Olson, II . | |
| 4,878,881 | 11/1989 | Van Dest . | |
| 4,894,044 | 1/1990 | Poulin et al. . | |
| 5,186,687 | 2/1993 | Hayashi et al. | 464/144 |

OTHER PUBLICATIONS

Chilon's Auto Repair 1954–1963, p. 697, Copyright 1971.
Chilton's Auto Repair 1954–1963, p. 697, Copyright 1972.
Chilton's Auto Repair 1954–1963, p. 697, Copyright 1981.
Doughtie, Elements Of Mechanism, John Wiley & Sons, Inc., New York, Sixth Edition, Apr., 1949, pp. 113–114, 147–153.

*Primary Examiner*—Daniel P. Stodola
*Assistant Examiner*—Eileen A. Dunn
*Attorney, Agent, or Firm*—Victor E. Libert; Frederick A. Spaeth

[57] ABSTRACT

A universal joint comparable in construction to a ball and socket joint in that it comprises a ball member (14) attached to a first shaft (10) and a socket member (16) attached to a second shaft (18), wherein the ball member (14) and the socket member (16) are both equipped with slots ($A_b$, $B_b$; $A_s$, $B_s$) at their adjoining slotted surfaces and are disposed so that the slots at least partially overlap to form pin passageways. A pin (22a, 24a) is disposed in each pin passageway to transfer rotational motion without variation from one shaft to the other. In preferred embodiments, the ball member and the socket member each have three slots ($A_b$, $B_b$, $C_b$; $A_s$, $B_s$, $C_s$). In some embodiments, the ball member may be hollow and the pins may be interconnected within the ball member to form a pin mechanism 42. In other embodiments, the ball member may be solid, and there may be a girdle member 26 surrounding the socket member, into which the pins extend.

7 Claims, 13 Drawing Sheets

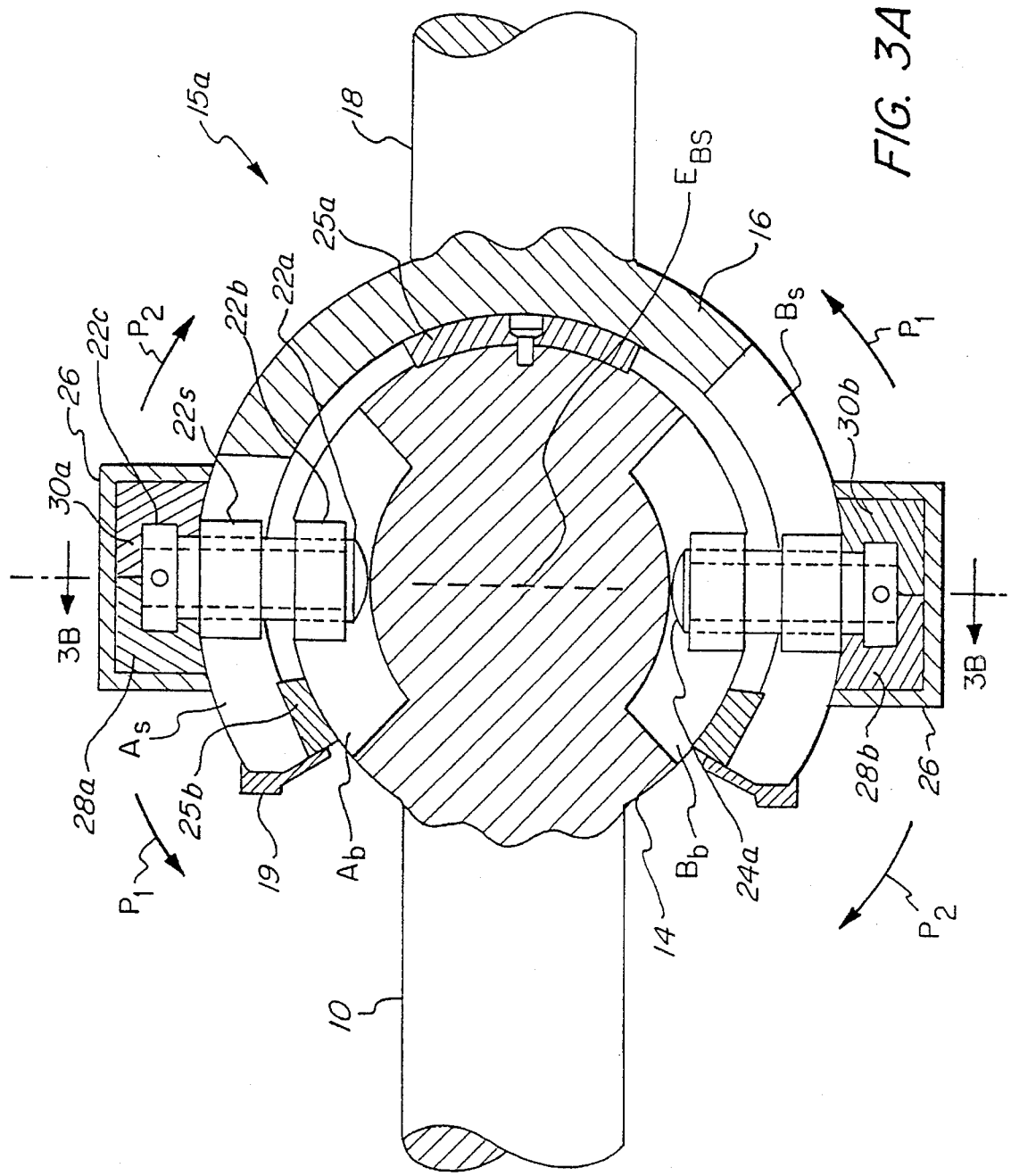

UNIVERSAL JOINT CONSTRUCTION

BACKGROUND OF THE INVENTION

1. Field of the Invention

The present invention relates to a universal joint construction and more specifically to a universal joint having two or more slotted members.

2. Related Art

Universal joints allow rotary motion to be transmitted from one shaft to another through an angle between the shafts. Such joints are used widely on propeller shafts and independently suspended driven wheels to accommodate suspension movement of the wheels. A well known universal is a Hooke's joint, which generally comprises a fork attached to each shaft with the tines of each fork extending toward the other shaft, with the forks arranged at right angles and interconnected by a cross piece to which they are pivotably attached. One characteristic of a Hooke's joint is that when the joint shafts are disposed at an angle other than 180°, the axial rotation of one shaft alternately leads ahead of and then lags behind the rotation of the other in the course of a single axial rotation. This lead-lag relationship is known in the prior art. See for example, Schwamb et al, *Elements of Mechanism*, sixth edition, revised by Doughtie, published by John Wiley and Sons, Inc., 1949, at pages 148–151, the disclosure of which is hereby incorporated herein by reference.

Some attempts have been made in the prior art to provide alternative mechanisms to a Hooke's-type joint and to produce a joint that has a more uniform relationship between the rotational speeds of the shafts. In a typical configuration of a joint of the prior art, one shaft has attached at the end a rigid tripod member which provides trunnions on which rotatable bearings or "rollers" are mounted, and the other shaft is equipped with a slotted member configured to receive the trunnions in the slots and to provide raceways against which the rollers bear. A typical arrangement is shown in U.S. Pat. No. 4,693,698 to Olson, II, dated Sept. 15, 1987 which shows a joint in which a tripod member 14 is fixedly mounted to shaft 12 to provide 3 equally spaced trunnions 21 that extend outwardly from the shaft. Each trunnion carries a roller bearing 25. The other shaft comprises a tulip member 13 having equally spaced petals or branches 15 separated by slots 16. Each slot is defined by a concave surface 17 on which roller bearings 25 bear. Related configurations are shown in U.S. Pat. No. 4,516,957; U.S. Pat. No. 4,175,407; U.S. Pat. No. 4,894,044 and U.S. Pat. No. 4,421,494.

U.S. Pat. No. 4,894,044 to Poulin et al dated Jan. 16, 1990 discloses a universal joint comprising a tripod 20 that is fixedly attached to shaft 22 at axial branches 30a, 30b and 30c (see e.g., column 3, line 54 through column 5, line 21). The branches, or trunnions, are equipped with rollers 36a, 36b, 36c that bear against raceways in slots of a tulip element 42. The shafts are held together by disposing tripod 20 in a spherical intermediate element 44, and configuring the inner surfaces of the tulip element to slidably "grasp" the intermediate member.

In a common alternative arrangement, the tripod member is fixed to the shaft by securing the ends of the radial trunnions to a cylindrical fixture on the shaft so that the trunnions extend inward toward the longitudinal axis of the shaft. For example, U.S. Pat. No. 4,878,881 to Van Dest dated Nov. 7, 1989 discloses a universal joint in which a tripod member 3 having three arms with roller bearings 6 thereon (see FIG. 3) is welded to a bowl member 9 on shaft 11 at end portion 23 of each arm of the tripod. The mating shaft 2 is equipped with a tulip or petal portion 8 including raceways or roller tracks 7 to receive rollers 6. In addition, a spider element 24 is mounted in the petal portion 8 on shaft 2 to receive the central bowl portion of tripod 3. Tripod 3 is secured in spider 24 by means of a muzzle 32. Related configurations are shown in U.S. Pat. No. 3,990,267 and U.S. Pat. No. 3,818,721.

In all of the foregoing prior art joints, rotational motion is transferred from one shaft to the other by trunnions fixedly attached to one of the shafts.

U.S. Pat. No. 4,091,641 to Welschof, dated May 30, 1978, discloses a universal joint comprising an annular inner joint member 4 that is received within an annular cavity 2 between a cylindrical member 6 and an outer joint element 1. The cylindrical member and the outer joint element have axial slots to receive pins or "torque transmitting elements" 8, which pass through cylindrical openings (not slots) in the inner joint member 4 (see column 2, lines 14–16). The inner member has a variable axial relationship to the joint member, in other words, the intersection point of the respective axes of rotation moves when the inner member is withdrawn from the annular cavity, as indicated by a comparison of FIG. 1 and FIG. 3.

SUMMARY OF THE INVENTION

Generally, the present invention provides a universal joint that can provide equal rotational motion between the shafts linked by the joint. Broadly speaking, the joint resembles a ball joint in which the ball member and socket member each have two pairs of associated slots that overlap to define pin passageways. A coplanar torque pin means, which may comprise hingedly interconnected pins or a girdle surrounding the joint, provides pins that extend through each pin passageway and keeps the pins in their proper orientations. Rotational motion is transferred from one shaft to the other through the pins.

More specifically, a constant velocity universal joint according to one embodiment of the present invention comprises a first shaft having a longitudinal first shaft axis and a ball member defining a substantially spherical convex ball surface fixedly mounted on the end of the shaft so that the center of the ball member is substantially aligned with the first shaft axis. The ball surface has (i) an imaginary ball shaft pole where the ball member is mounted on its shaft; (ii) an imaginary ball end pole diametrically opposite to the ball shaft pole, and (iii) an imaginary circumferential equator line equidistant at all points from the ball shaft pole and the ball end pole. The ball member defines at least two ball slots at its convex surface, both of which are disposed along imaginary great circles on the ball surface, the great circles being displaced at equal degrees and in like directions at their respective points of intersection with the equator with respect to meridians passing through the respective intersection points. The ball is disposed in a socket member that is fixedly mounted on a second shaft having a longitudinal second shaft axis and that is dimensioned and configured to receive the ball member therein.

The socket member defines a substantially spherical concave socket surface and is fixedly mounted on the end of the second shaft so that the center of the socket member is substantially aligned with the second shaft axis. The socket surface has (i) an imaginary socket shaft pole where the socket is attached to its shaft, (ii) an imaginary socket end pole at a point diametrically opposite to the shaft pole, and (iii) an imaginary circumferential equator line equidistant at all points from the socket shaft pole and the socket end pole. Further, the socket member defines at least two socket slots at its concave surface, both of which are disposed along imaginary great circles on the socket surface, the great circles being displaced to equal degrees and in like directions at their respective points of intersection with the equator line with respect to meridians passing through the respective intersection points. The direction in which the socket slots are displaced is opposite to the direction of displacement of the ball slots.

Each ball slot overlaps an associated socket slot to define a pin passageway. The universal joint further comprises coplanar torque pin means comprising a torque pin extending through each pin passageway for transferring rotational motion from one of the ball member and the socket member to the other, and for keeping the pins in mutual coplanar relation to one another.

According to one aspect of the invention, the great circles along which the ball slots and socket slots are disposed may be situated symmetrically about their respective surfaces, so that their intersection points with their respective equator lines are spaced at regular intervals along the equator lines.

According to another aspect of the invention, the ball member may be hollow and the ball slots may be open slots. In such case, the coplanar torque pin means may comprise a pair of hingedly interconnected pins rotatably mounted on stabilizer pins mounted in the ball member in a perpendicular orientation with respect to the first shaft axis. The stabilizer pins are preferably mounted at points substantially mid-way between the ball slots.

According to still another embodiment, the socket slots may be open slots and the coplanar torque pin means may comprise torque pins that extend from the ball slots through and beyond the socket slots. The coplanar torque pin means may then comprise (i) a girdle member, surrounding the socket member and defining a track, the girdle member being pivotably attached to the socket member at points defining a girdle pivot axis disposed perpendicular to the second shaft axis and preferably substantially mid-way between the socket slots, and (ii) slide blocks slidably disposed in the track and on the surface of the socket member for receiving the pins. The girdle member and slide blocks constrain the pins to remain in mutual coplanar relation with each other.

Another aspect of the invention provides that the ball member may define three slots on the ball surface and the socket member may define three slots on the socket surface. In such case, the ball member may be hollow and the ball slots may be open slots, and the coplanar torque pin means may comprise three pins hingedly interconnected within the ball member to form a planar-articulated star member that keeps the pins in mutual coplanar relation with each other.

According to yet another embodiment of the invention, the socket member may comprise a plurality of socket sections, each socket section comprising a section of the concave spherical surface, and the socket member may further comprise a socket head attached to the shaft and dimensioned and configured to receive the socket sections and means for securing the socket sections in the socket head.

Although it is preferred to employ displaced slots, it is not necessary to do so in embodiments of the invention comprising three or more slots.

BRIEF DESCRIPTION OF THE DRAWINGS

FIG. 3A is a cross-sectional view of one embodiment of a constant velocity universal joint according to the present invention;

DETAILED DESCRIPTION OF THE INVENTION AND PREFERRED EMBODIMENTS THEREOF

The present invention relates to a universal joint which, in its broadest aspects, can be compared to a ball and socket joint in that it comprises a ball member having a substantially spherical convex sliding surface and a socket member defining a substantially spherical concave sliding surface dimensioned and configured to receive the ball member therein. Unlike a conventional ball and socket joint, however, both the ball member and the socket member of a joint according to the present invention have at least two slots on their respective sliding surfaces, there being a ball slot associated with each socket slot, and being dimensioned and configured to create a pin passageway extending through both associated slots. Rotational motion is transferred from one shaft to the other by a pin mechanism that includes a pin disposed in each pin passageway. A joint according to the present invention can provide constant rotational velocity between the driven and driving shafts over a wide range of shaft-to-shaft angles.

Figure 1A:
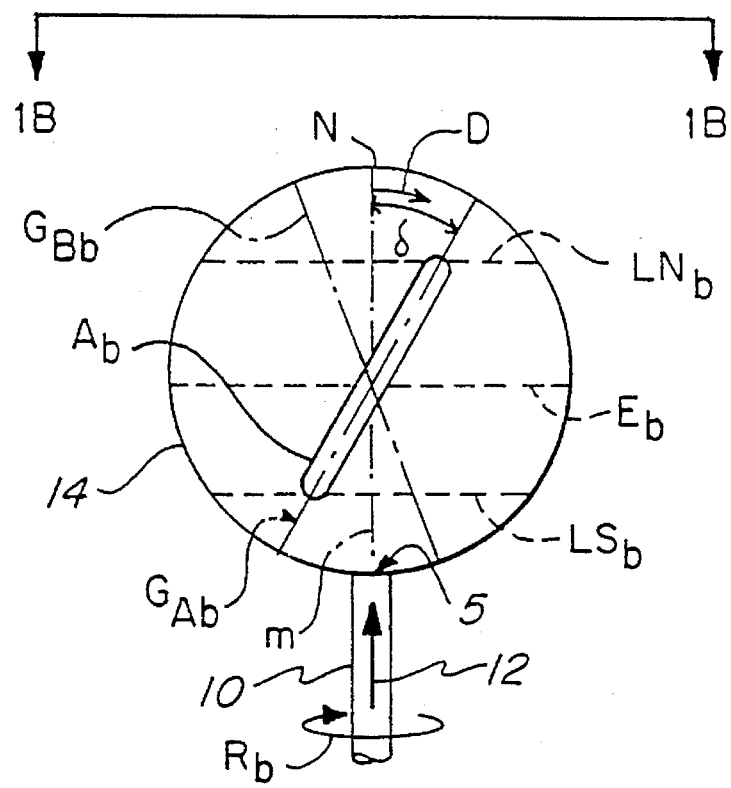
FIG. 1A and FIG. 1B are schematic views of a ball member for use in a universal joint according to the present invention.
Figure 1B:
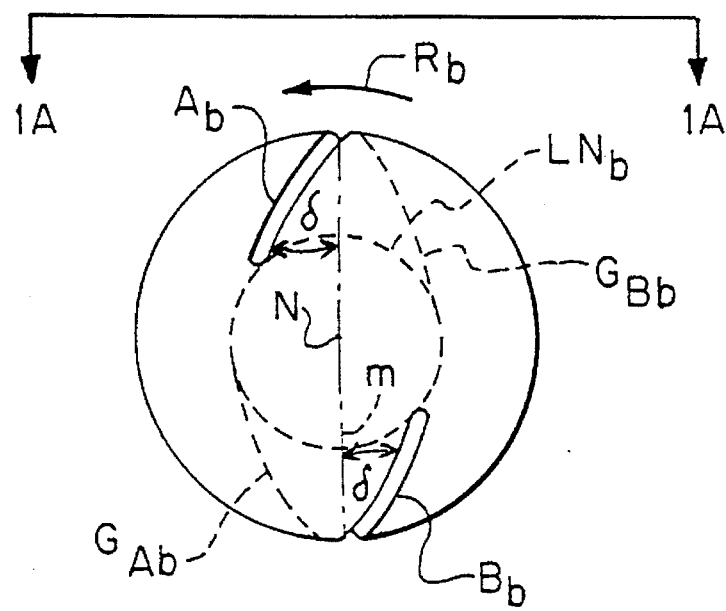

A constant velocity universal joint according to the present invention may comprise a first shaft 10, as shown in FIG. 1A, having a longitudinal axis 12 about which the shaft rotates in a direction indicated by rotation arrow $R_b$. A substantially spherical solid ball member 14 is fixedly mounted on the end of first shaft 10 so that axis 12 passes through the center of ball member 14, defining an axis of rotation therethrough. Ball member 14 has two ball slots, $A_b$ and $B_b$ (FIG. 1B). Ball slots $A_b$ and $B_b$ are elongate and have lengths that relate to the degree of angular movement attainable by the joint, as will be discussed below.

It is convenient to describe the orientation of the slots on spherical sliding surfaces by analogy to terrestrial geometry by comparing the spherical sliding surfaces to the surface of the earth, with axis of rotation of the associated shaft corresponding to the north-south axis of rotation of the earth. To avoid confusion in discussing poles on the ball member and the socket member, the point where the shaft is attached to the spherical member is referred to herein as the shaft pole. On ball member 14, the shaft pole is indicated by the 'S' in FIG. 1A. The pole diametrically opposite to a shaft pole is referred to herein as the end pole. On ball member 14, the end pole is indicated by the 'N' in FIG. 1A. Following the terrestrial analogy, the term "south" or "southern" will sometimes be used herein to indicate a region or direction on a spherical surface from the equator line to the shaft pole, and the term "north" or "northern" will sometimes be used herein to indicate the region or direction on a spherical surface opposite to the south. Further, the great circle on a spherical surface running perpendicular to the axis of rotation and disposed equidistant from both poles is sometimes referred to herein as the "equator line" of that surface. Similarly, the term "latitude lines" or "latitudes" will sometimes be used herein to refer to circles on a spherical surface which lie in a plane parallel to the plane of the equator line but which are closer to one pole than the other. For purposes of this discussion, a slot that follows a great circle that runs perpendicular to the equator line, i.e., that runs from one pole of the spherical surface to the other like the meridians of the earth, is referred to herein as a "straight" slot, notwithstanding the fact that it lies on a substantially spherical sliding surface and therefore has a curved aspect.

In accordance with the analogy described above, slot $A_b$ is not a straight slot because the great circle $G_{Ab}$, along which slot $A_b$ is disposed, does not run from pole to pole on the spherical surface of ball member 14 along a meridan M; rather, great circle $G_{Ab}$ is displaced from M in the direction of arrow D to an angle $\delta$ about the common equatorial intersection of point great circle $G_{Ab}$, meridian M and equator line $E_b$. When viewed from outside the joint, displacement of great circle $G_{Ab}$ from M is in a clockwise direction, and slot $B_b$ (FIG. 1B) is disposed along great circle $G_{Bb}$ which is also displaced clockwise from meridian M to an angle $\delta$. Slots $A_b$ and $B_b$ extend to equal north and south latitudes $LN_b$ and $LS_b$, both of which are circles on the spherical ball member surface that run parallel to and are equidistant from, equator line $E_b$. Preferably, the socket member within which the ball member is disposed will have slots that are displaced to an equal degree as the ball slots but in the opposite direction and that extend to corresponding latitudes on the spherical socket surface.

Figure 2A:
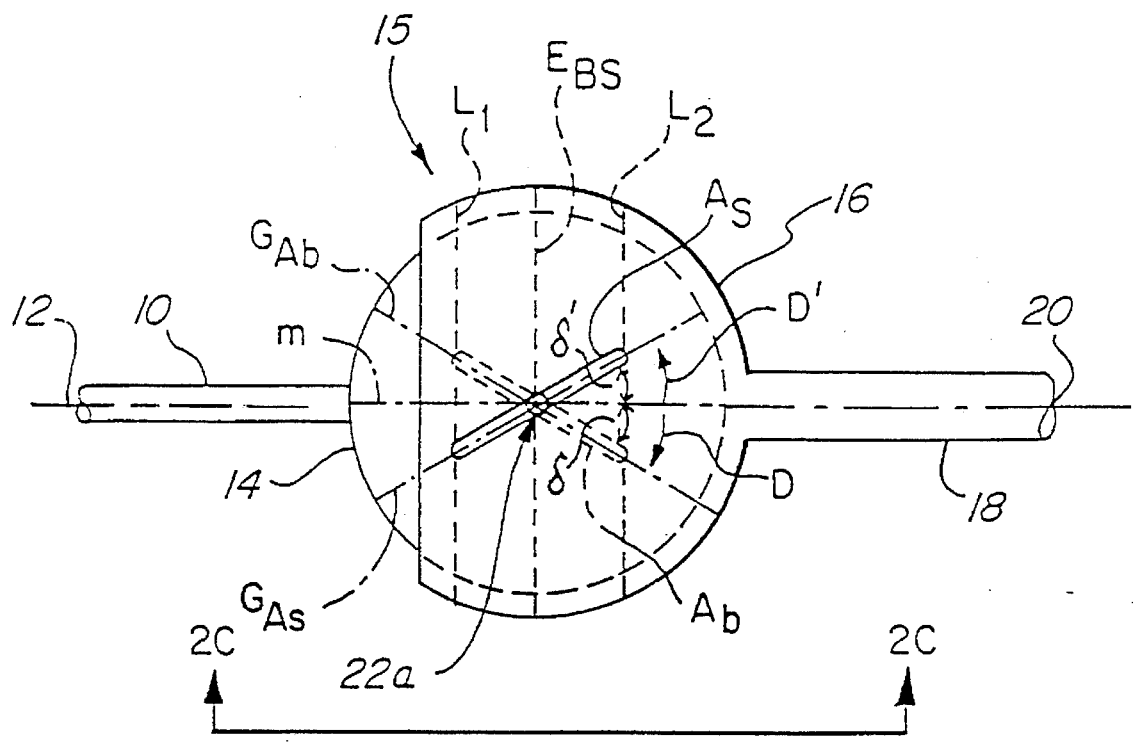
FIG. 2A is a schematic representation of a universal joint according to the present invention.
Figure 2B:
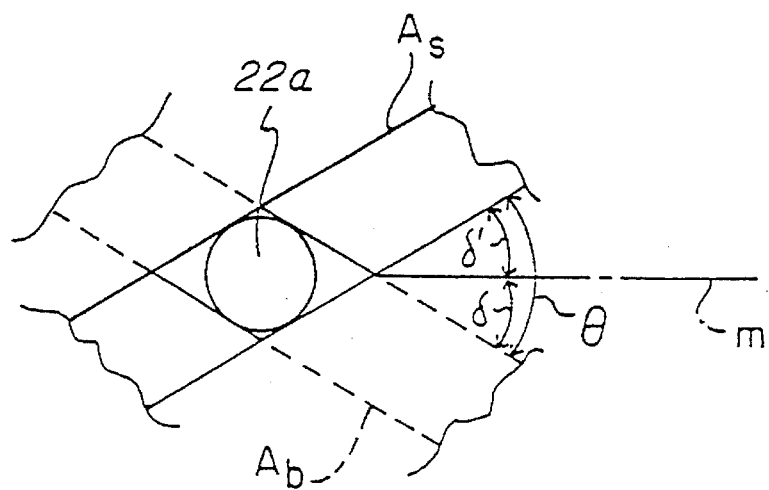
FIG. 2B is an enlarged view of the central portion of FIG. 2A.

The general configuration of one embodiment of a universal joint 15 according to the present invention is shown schematically in FIG. 2A, where ball member 14 is received within a socket member 16. Socket member 16 is fixedly mounted on the end of a second shaft 18 having a longitudinal second axis 20 about which shaft 18 rotates. Socket member 16 has a substantially spherical concave sliding surface dimensioned and configured to slidably engage the surface of ball member 14. Since first shaft 10 and second shaft 18 are aligned, i.e., disposed at a mutual angle of 180°, their respective equator lines coincide and are indicated by $E_{BS}$. Like ball member 14, socket member 16 has two slots disposed along an imaginary great circle on its surface, only one of which, slot $A_s$, is shown. Ball slot $A_b$ and socket slot $A_s$ are similarly dimensioned and configured, but slot $A_s$ is disposed along great circle $G_{AS}$ and is displaced on the socket surface at an angle $\delta'$ equal in magnitude to $\delta$ but in the opposite direction, i.e., counter clockwise when viewed from outside the joint, in other words, in a direction D' which is opposite to that of D. The socket slots extend from the equator line of the socket surface to latitudes $LN_S$ and $LS_S$ (FIG. 2D) corresponding to $LN_b$ and $LS_b$, FIG. 1A on the ball member. Since the shafts are aligned and since slots $A_b$ and $A_s$ are similarly configured, the latitudes to which they extend coincide and they are shown in FIG. 2A at $L_1$ and $L_2$. When the shafts are aligned, the pin passageways dispose the pins on the equator line $E_{BS}$. Further, slots $A_b$ and $A_S$ will be disposed at a mutual angle $\theta$ shown in the enlarged view of FIG. 2B) which will be equal to twice $\delta$, and will together define a pin passageway in the rhomboid region in the center of FIG. 2B, within which pin 22a is disposed. Angle $\delta$ may be at least about 2°.

Figure 2C:
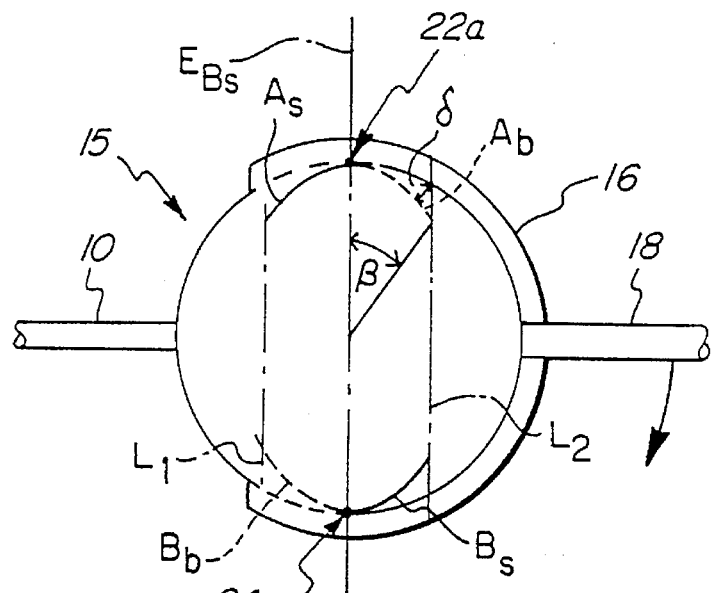
FIG. 2C is a schematic representation of the universal joint of FIG. 2A taken along lines 2C—2C.
Figure 2D:
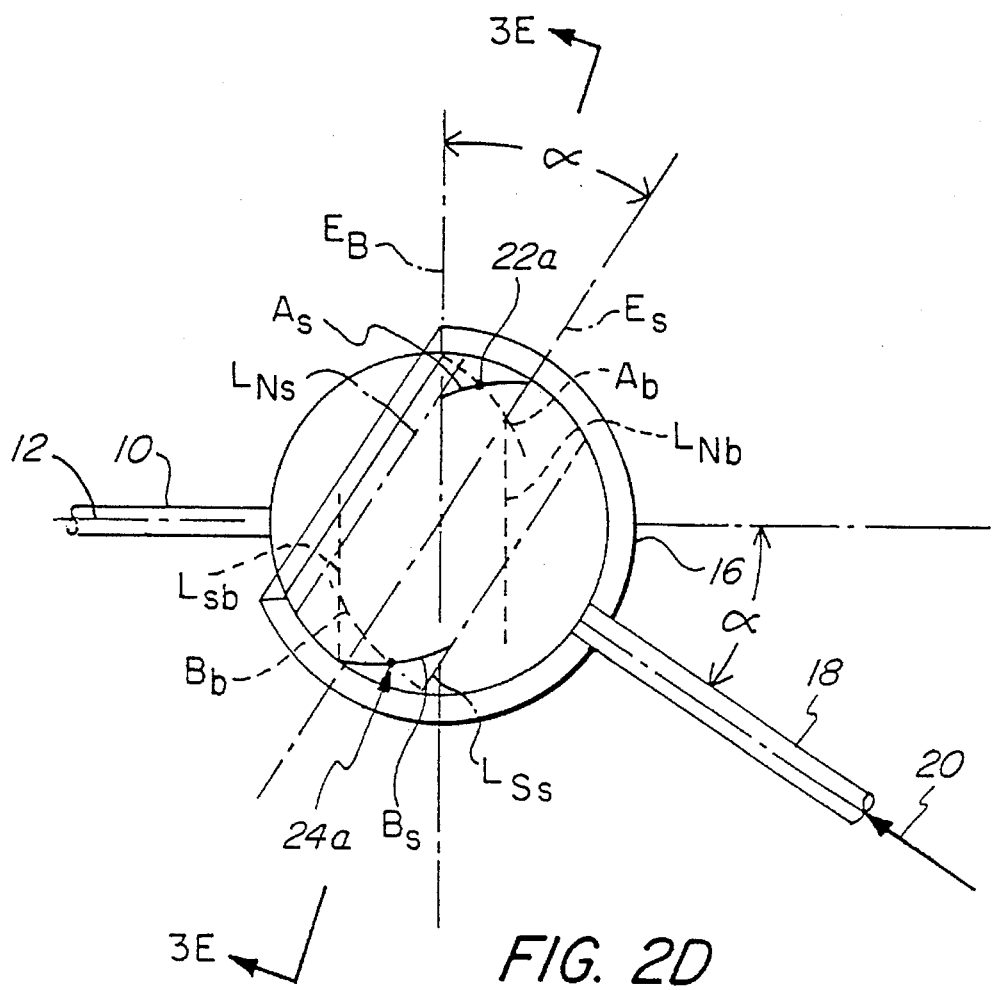
FIG. 2D is a view similar to FIG. 2C showing relative displacement between the shafts.

FIG. 2C is a schematic representation of the joint of FIG. 2A taken along lines 2C—2C. In the view of FIG. 2C, it is easily seen that both pins are disposed on the coinciding equator lines of the ball surface and the socket surface when the shafts are aligned. Displacement of shaft 18 in the direction indicated by the arrow (un-numbered) results in the configuration represented in FIG. 2D. With the shafts thus displaced relative to one another, the equator lines of the ball member $E_b$ and the socket member $E_S$ will likewise be disposed at a relative mutual angle $\alpha$, as will their respective latitude lines. In the view of FIG. 2D, the socket slots will appear to rotate clockwise about the center of the joint as a result of the displacement indicated in FIG. 2C. Since ball slot $A_b$ remains stationary, the pin passageway where pin 22a is disposed moves away from shaft 10, i.e., "northerly" on the ball member surface. Since the ball surface, socket surface and associated slots are similarly dimensioned and configured, it will be understood that symmetry considerations will dispose the pin passageway and therefore pin 22a at a point equidistant between equator line $E_b$ and $E_S$. A similar effect occurs with respect to slots $B_b$ and $B_S$, with the result that pins 22a and 24a approach each other radially about the center of the joint. However, pin 24a moves in its respective slots toward shaft 10, rather than away, as did pin 22a. Still, pin 24a is disposed at a point equidistant between equatorial lines $E_b$ and $E_S$. Since the pins are thus constrained to move to positions equidistant between the mutually displaced equator lines, they will travel in a plane that bisects the angle between the shafts. The transmission of rotational motion from one shaft to another through linkages disposed in a plane bisecting the angle between the shafts results in constant angular velocity from one shaft to the other, i.e., there is an equal correspondence between the angular rotation of shaft 10 about its axis 12 and the corresponding rotation of shaft 18 about its axis 20.

It may further be noted that displacement of shaft 18, as shown in FIG. 2D, has caused the pins to move from the center positions in the slots toward their polar ends, i.e., pin 22a is now disposed in the "northern" portion of slots $A_S$ and $A_b$ while pin 24a is disposed in the "southern" portion of slots $B_b$ and $B_S$. Further angular displacement of shaft 18 will cause the pins to move still closer to the polar ends of the slots. Thus, as suggested above, the latitudes to which the slots extend can be a limiting factor for relative angular displacement of the shafts. If the end point of the travel of the pin in the slot is measured radially from the center of the joint to an angle β as shown in FIG. 2C, angle β should be equal to at least one half of the maximum desired range of relative angular displacement between the shafts.

One particular embodiment of a universal joint 15a according to the present invention is illustrated in FIG. 3A, where it is seen that the ball member 14 and the socket member 16 each have two slots, $A_b$, $B_b$ and $A_S$, $B_S$, respectively, which are dimensioned and configured as suggested in FIG. 2A and which define pin passageways within which pins 22a and 24a are disposed. Since shafts 10 and 18 are aligned, the pin passageway for pin 24a is positioned diametrically opposite the pin passageway for pin 22a, both of which are situtated at the coinciding ball m ember and socket member equator lines indicated at $E_{BS}$. Socket member 16 has a substantially spherical convex outer surface as well as a substantially spherical concave inner surface. Universal joint 15a comprises coplanar torque pin means comprising pins 22a and 24a and a girdle assembly. The girdle assembly comprises an annular girdle 26 which encircles socket member 16, and slid blocks, described below. Girdle 26 has a U-shaped cross-sectional configuration defining a track therein where slide blocks comprising two parts, e.g., first part 28a and second part 30a and part 28b and part 30b, are slideably disposed.

Pin 22a comprises rollers 22b and 22s to facilitate motion in slots $A_b$ and $A_s$, respectively. Pin 22a further comprises a securing head 22c, and parts 28a and 30a are dimensioned and configured to securely receive securing head 22c to retain pin 22a therein. Girdle 26 is pivotably mounted on socket member 16 so that it can pivot about a girdle axis that runs perpendicular to the second shaft axis, either in the direction of corresponding pivot arrows $P_1$ or in the opposite direction of corresponding pivot arrows $P_2$. Optionally, the slots are lined with durable, low-friction materials suited for contact with the rollers, e.g., heat treated steel. In some embodiments, the ball member and/or the socket member may define recesses into which slotted inserts made from suitable materials may be secured. Thus, the slotted inserts may be machined apart from the ball member and/or the socket member, which may then be made from materials different from that of the slot inserts, if desired for reasons of economy, manufacturing convenience, etc.

Figure 3B:
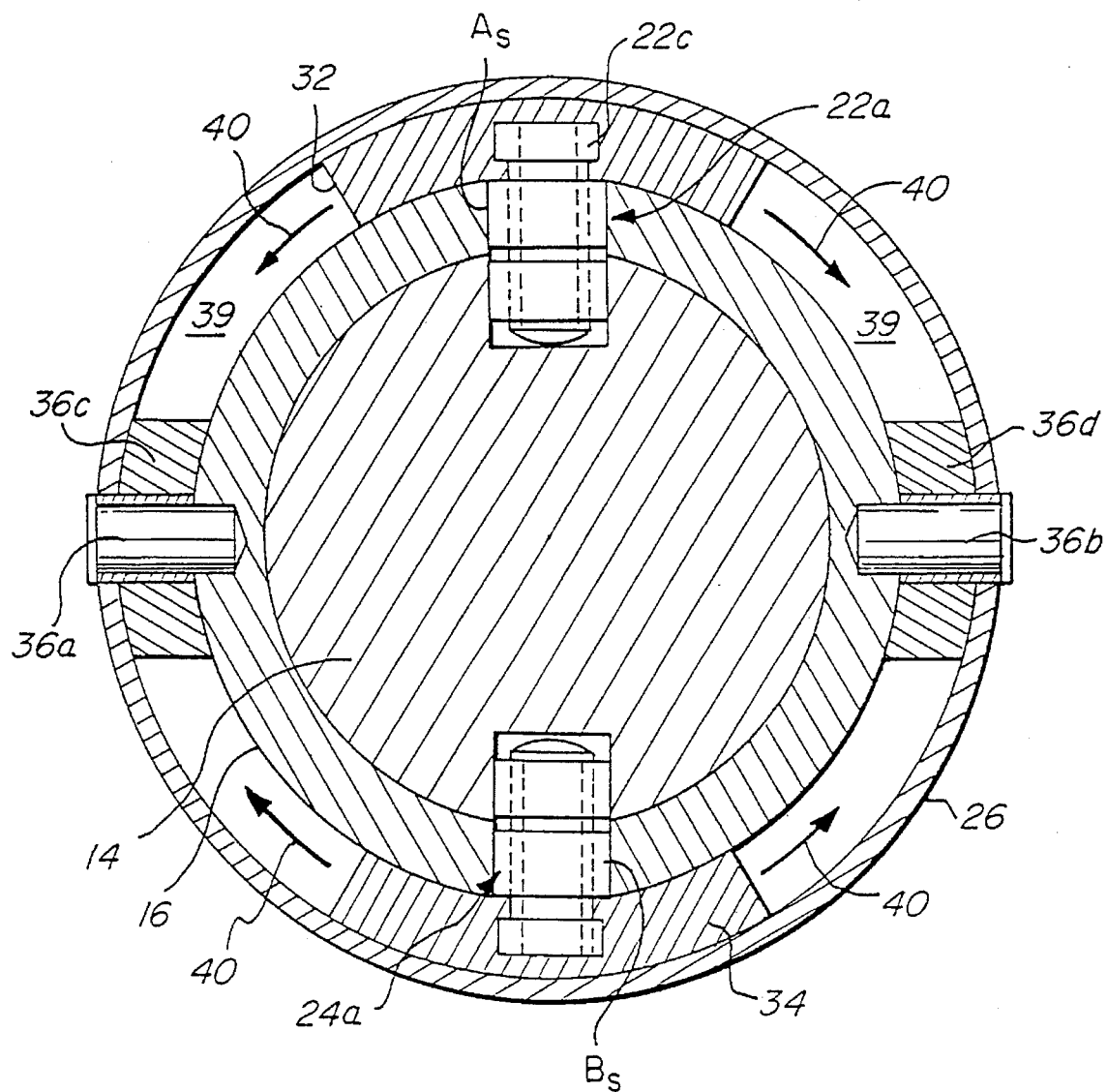
FIG. 3B is a cross-sectional view of the universal joint of FIG. 3A taken along lines 3B—3B.

The pivot mounting of girdle 26 may be better understood with reference to FIG. 3B where it is seen that pivot pins 36a and 36b pivotably attached girdle 26 to socket member 16 through spacers 36c and 36d, respectively. Pivot pins 36a and 36b are disposed at the socket member equator at points substantially mid-way between the socket slots, i.e., about half way between the points on the equator where the socket slots intersect the equator. As indicated above, slid block 32 is free to slide in track 39 defined by girdle 26 in the direction of slide arrows 40.

The coplanar torque pin means comprising girdle 26 and slide blocks 32 and 34 permit radial movement of the pins about the center of the joint so that the pins may approach or retreat from each other radially in the direction of arrows 40 (FIG. 3B). However, girdle 26, due to the pivotable mounting of pivot pins 36a and 36b will only permit one pin at a time to approach a given shaft. For example, in the configuration of FIG. 3A, if girdle 26 pivots in the direction of arrow $P_1$, pin 22a will approach shaft 10 but pin 24a will move away from shaft 10, approaching instead shaft 18 in the direction of arrow $P_2$, and to the same degree that pin 22a approaches shaft 10. Thus, the mechanism accommodates the pin movement described above in connection with FIGS. 2C and 2D.

A joint as illustrated in FIGS. 3A and 3B may be assembled in a manner similar to that known for the assembly of conventional ball and socket joints. If necessary, the socket member may be broken or cracked so that the ball member can be inserted therein, and the socket member may then be reassembled, e.g., by welding. In addition, a clamping or retaining ring may be passed over the ball member after the ball member is inserted into the socket member, to engage the annular edge of the socket member to further secure the ball member therein. Thus, after the ball member is received Within the socket member, retaining ring 19 may be passed over first shaft 10 to secure socket member 16 on ball member 14.

The ball member and socket member are arranged to associate their respective slots to form pin passageways, and the pins are inserted therein. Parts 28a and 30a of slide block 32 are assembled to enclose the pin securing head 22c; slide block 34 is likewise assembled about pin 22b. Girdle 26 is assembled from two semi-circular halves that are brought together, e.g., by welding, after slide blocks 32 and 34 are assembled. Then, girdle 26 may be pivotably secured to socket member 16 as shown in FIG. 3B, by pivot pins 36a and 36b at points on the socket member equator and preferably equidistant between slots $A_S$ and $B_S$.

It is preferred to reduce the surface area of contact between the ball member and the socket member by providing a seating means between them. This can be achieved by disposing, e.g., a seating pad 25a and seating ring 25b between the ball member and the socket member. Seating pad 25a and seating ring 25b are preferably made from a material that facilitates motion between the ball members and the socket members. For example, they may comprise a graphite-containing composite material having a suitably low coefficient of friction, or may be made of some other suitable material, e.g., bearing bronze. A lubricating material may be disposed in the clearance between ball member 14 and socket member 16 and the joint may be sealed about the opening of socket member 16 to retain the lubricant therein. In alternative embodiments seating pad 25a and seating ring 25b may be replaced with spaced-apart arcuate sections of seating rings, or a plurality of strategically placed contact pads. The seating means may be secured to one of the ball member or the socket member prior to assembly of the joint. For example, seating pad 25a is mounted on the ball member and seating ring 25b is mounted to the socket member. For ease of illustration, subsequent Figures will not show the retaining ring 19 or contact pads 25a or 25b, it being understood that these features may be included in subsequently described embodiments, as desired. The use of such seating means allows the use of a socket member of slight increased diameter, which will facilitate assembly of the joint.

In the embodiment of FIGS. 3A and 3B, the ball slots are "closed slots" i.e., the ball member is a solid structure. However, the socket is hollow and the socket slots are "open slots" meaning that the slot allows the pin to pass from the interior to the exterior of the socket member.

Figure 3C:
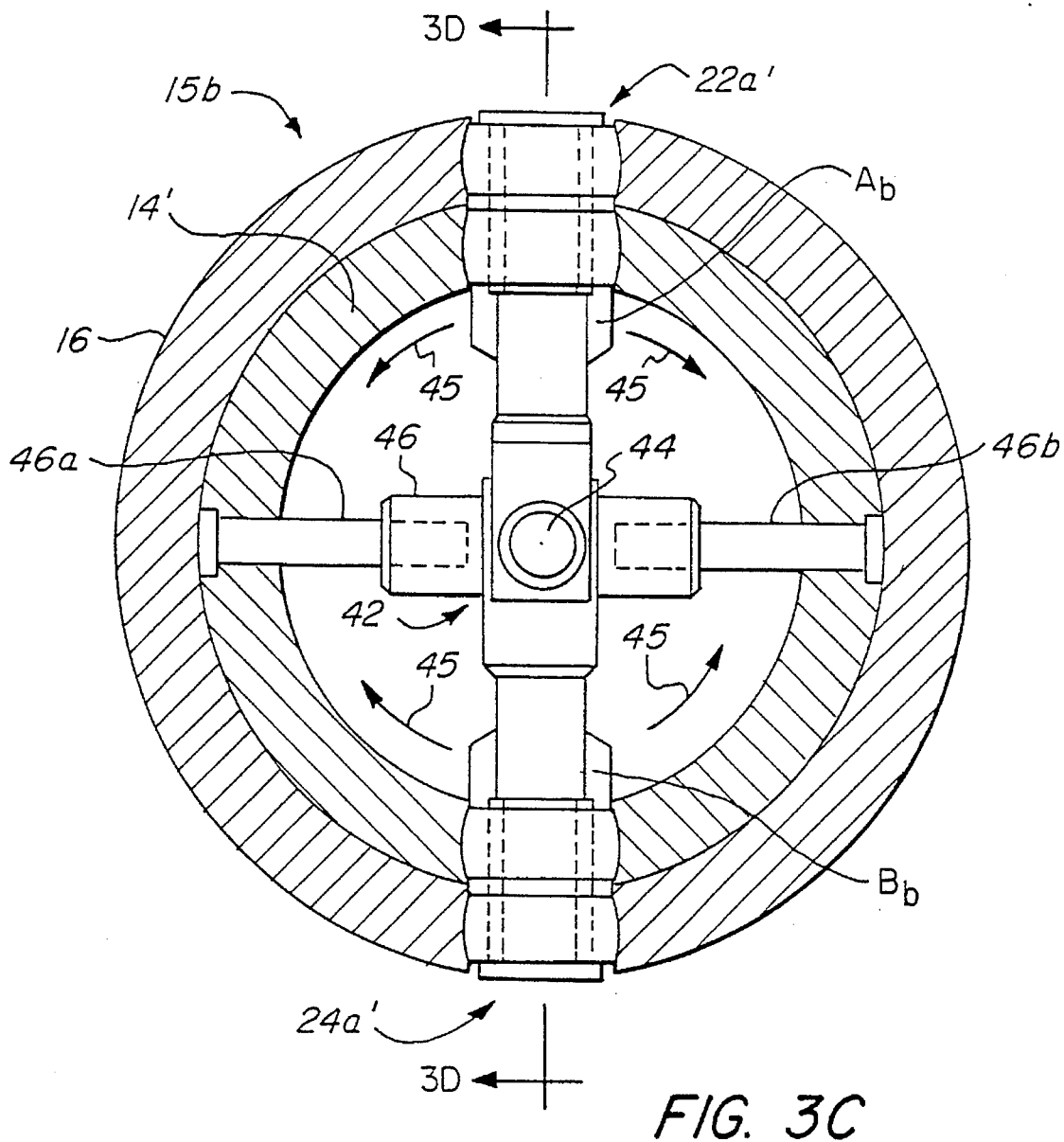
FIG. 3C is a partly cross-sectional view similar to FIG. 3B of another embodiment of a universal joint according to the present invention.
Figure 3D:
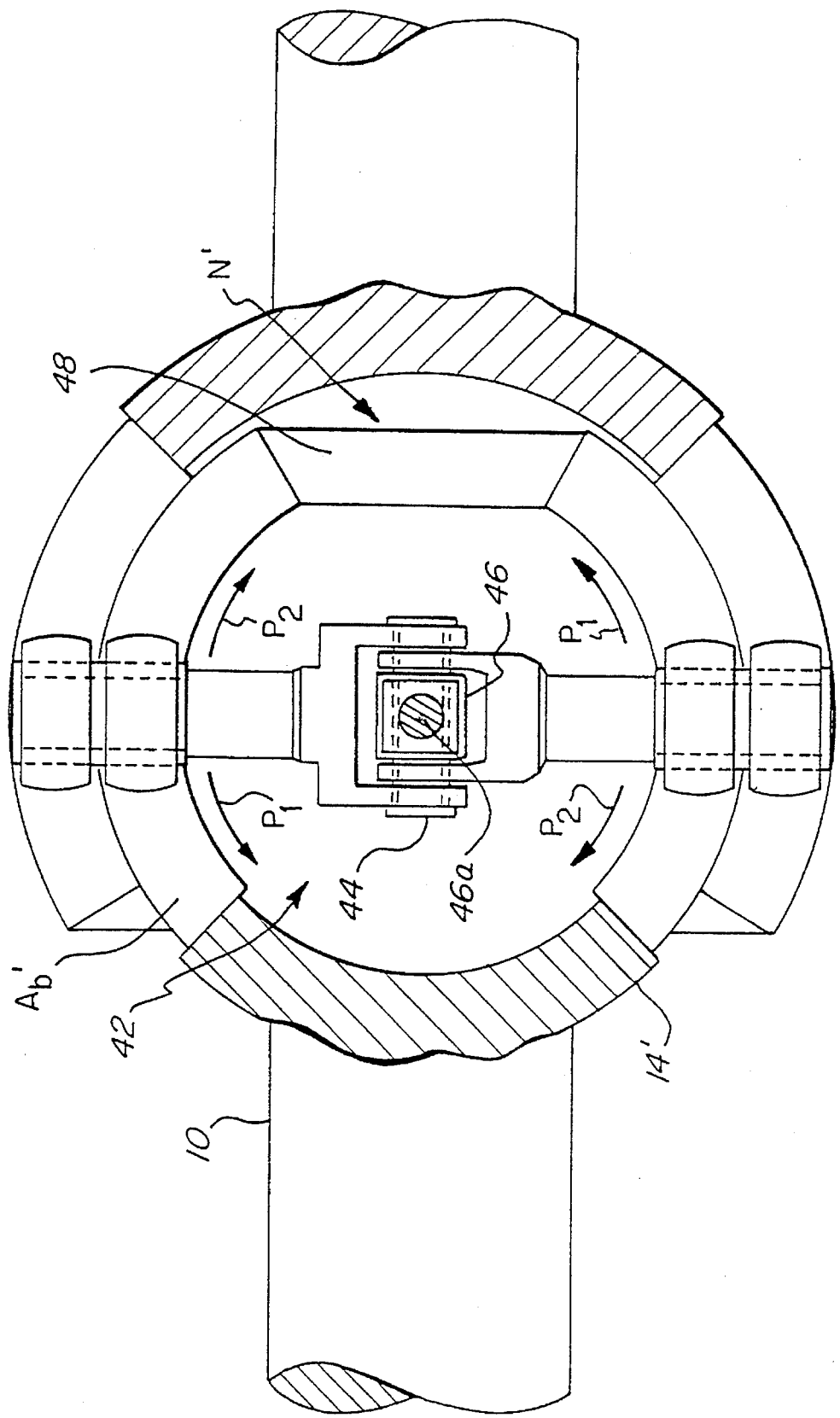
FIG. 3D is a view similar to FIG. 3A of the universal joint of FIG. 3C.
Figure 3E:
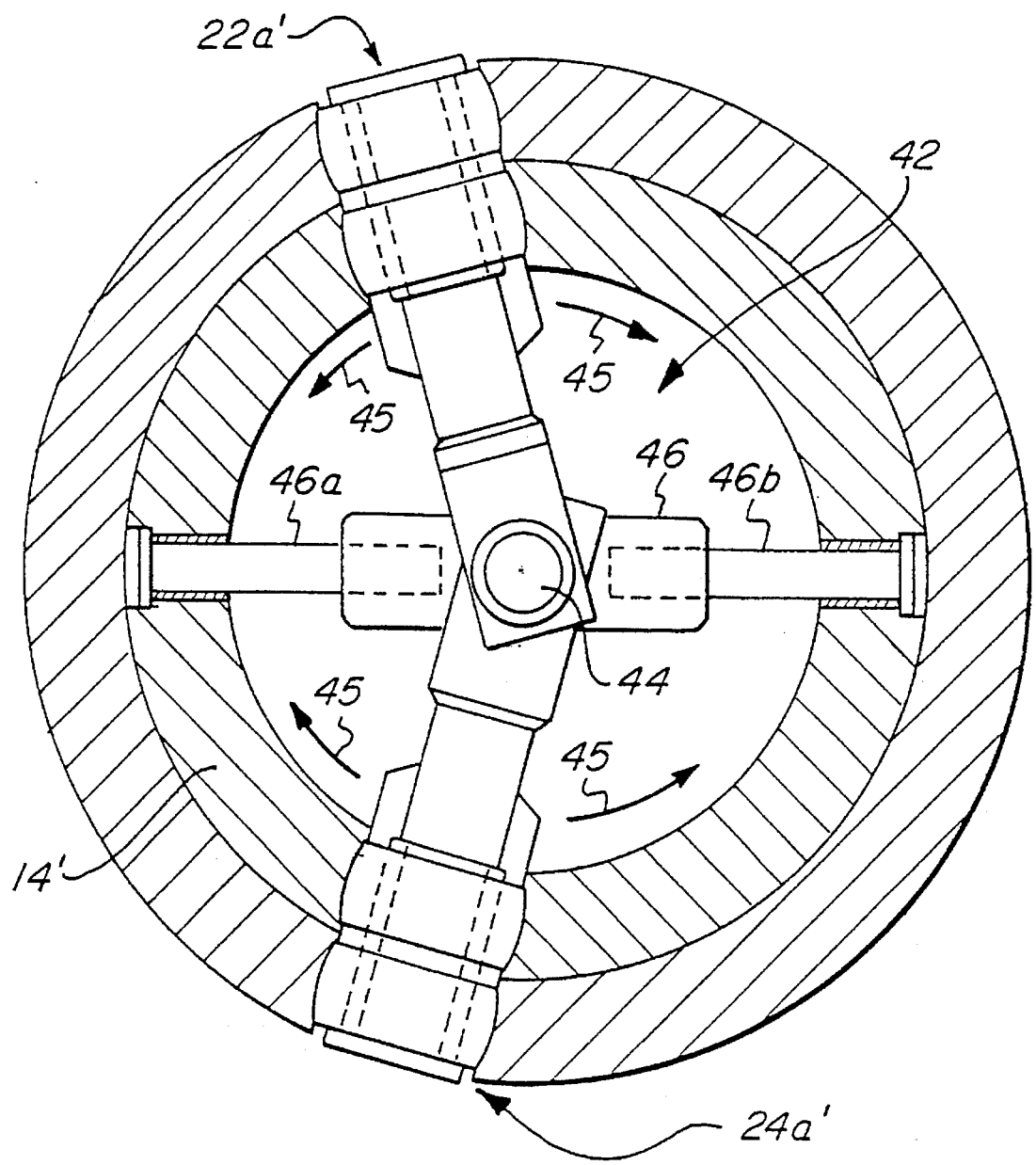
FIG. 3E is a view similar to FIG. 3C of the joint of FIG. 3C When the shafts are disposed as shown in FIG. 2D, taken along lines 3E—3E of FIG. 2D.

In an alternative embodiment shown in FIGS. 3C and 3D, a universal joint 15b may comprise a hollow ball member 14' and the coplanar torque pin means of the joint comprises an articulated pin mechanism 42 in which pins 22a' and 24a' are pivotably interconnected so that they can pivot toward or away from each other about pivot pin 44 as suggested by the movement arrows 45. The articulated pin mechanism is rotatably mounted on stabilizer pins 46a and 46b which are mounted within ball member 14' in perpendicular relation to first shaft 10 (FIG. 3D) and which are secured in a stabilizing center block 46. Preferably, stabilizer pins 46a and 46b are mounted in the ball at the equator of the ball surface and at points on the equator mid-way between the ball slots. The pins 22a' and 24a' are hingedly interconnected through center block 46, which is rotatably mounted on stabilizer pins 46a and 46b so that the pins can rotate in a manner that allows one pin to approach the ball shaft while the other moves away, as suggested by pivot arrows $P_1$ and $P_2$. The resulting rotating, pivoting pin mechanism is capable of a rotating, pivoting action similar to that exhibited by a conventional toggle bolt. Thus, pin mechanism 42 allows the same pin motion as the girdle mechanism of the embodiment of FIG. 3A and 3B. For example, the configuration of FIG. 2D can be accommodated as shown in FIG. 3E. Preferably at least one pin, e.g., pin 22a' comprises a counter-balance portion that extends beyond pivot pin 44 to counter-balance the pin about the center of the joint to reduce vibration at high rotational speeds.

Figure 4A:
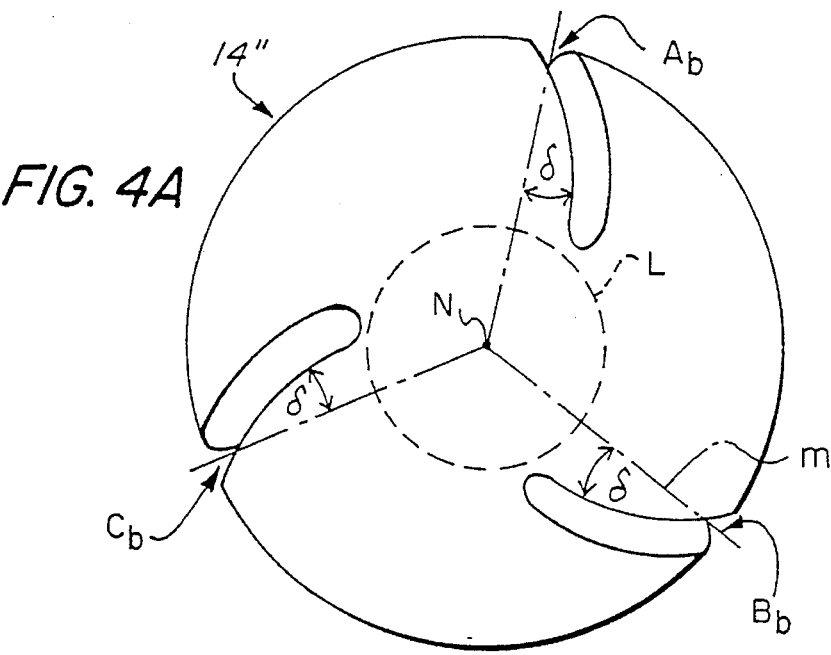
FIG. 4A is an elevation view of a ball member having three displaced slots according to another embodiment of the present invention.
Figure 4B:
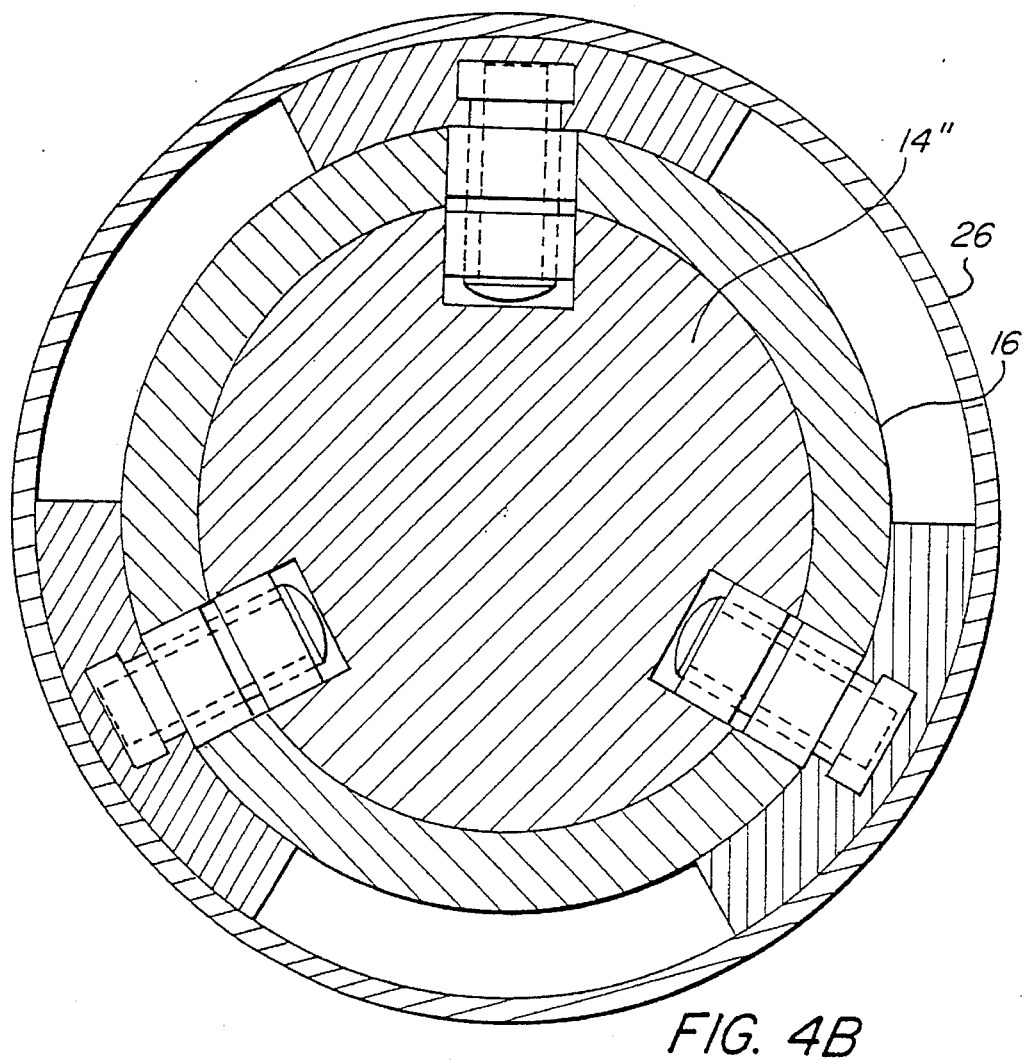
FIG. 4B is a cross-sectional view of a constant velocity universal joint comprising the ball member of FIG. 4A.

In an alternative embodiment, a constant velocity universal joint according to the present invention may comprise a ball member and socket member having three pairs of associated slots. Thus, in the end view of FIG. 4A, ball member 14" has three slots, $A_b$, $B_b$ and $C_b$, each having equal lengths so that they extend to latitude L and are displaced from a straight orientation by angles δ. The socket member used in conjunction with the ball member of FIG. 4A has three corresponding slots, displaced by angles δ in a direction opposite to the direction of displacement of the ball slots. The coplanar torque pin means comprises a girdle assembly and pins that extend through the socket slots into the girdle assembly, as shown in FIG. 4B, similar to that shown in FIGS. 3A and 3B. However, in the three-pin configuration, it is not necessary to pivotably attach girdle 26 to socket member 16.

Figure 4C:
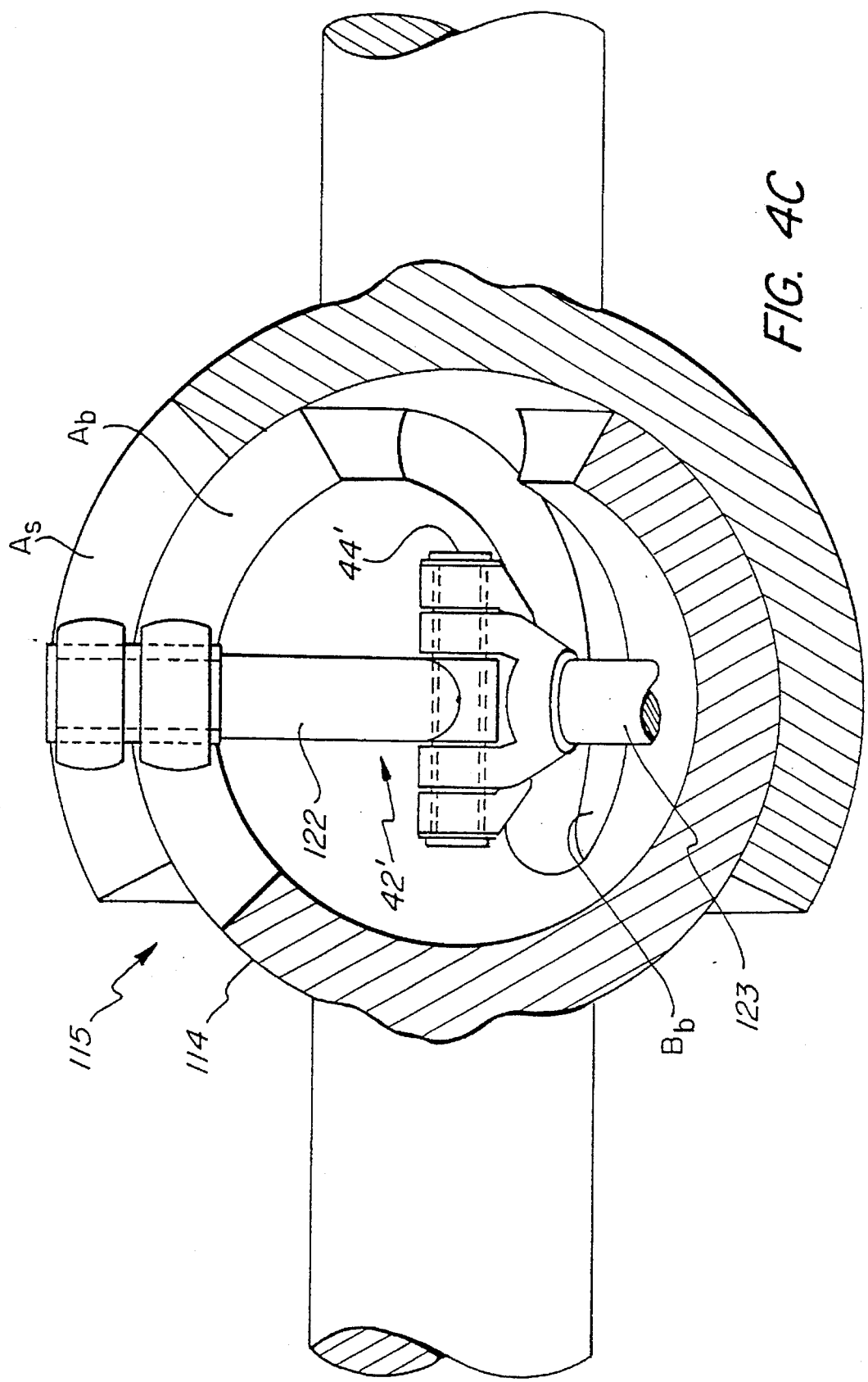
FIG. 4C and FIG. 4D are cross-sectional views of still another embodiment of the invention.
Figure 4D:
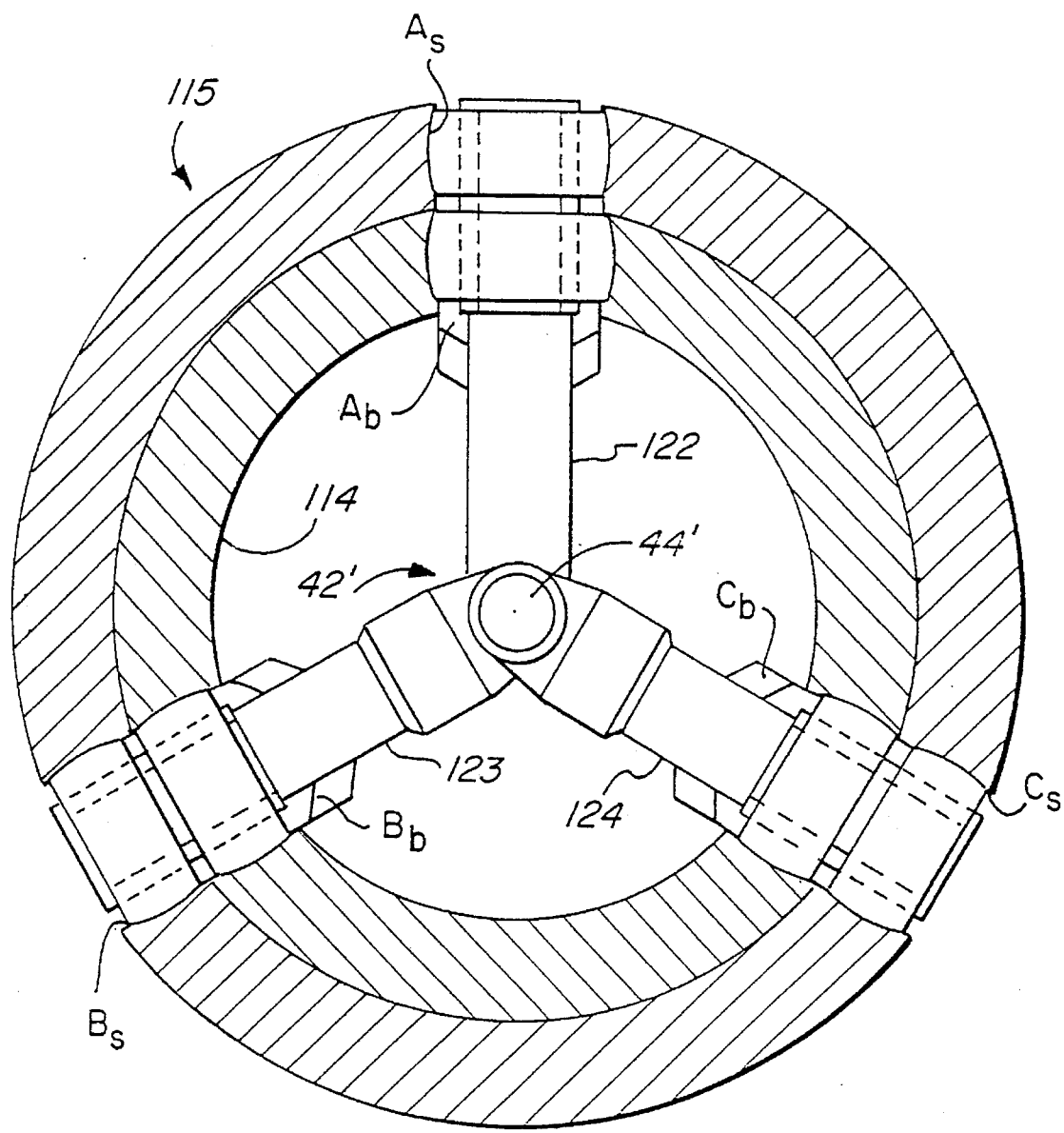

In yet another alternative embodiment of the present invention, the ball member may be hollow, as is ball member 114 of joint 115 shown in FIGS. 4C and 4D. In this case, ball slots $A_b$, $B_b$ and $C_b$ are open slots, allowing pins 122, 123 and 124 to pass from the interior to the exterior of the ball member. The coplanar torque pin means comprises pins 122, 123 and 124 which pass from the interior of ball member 114 to the associated slots $A_S$, $B_S$ and $C_S$. Pins 122, 123 and 124 are hingedly interconnected by hinge pin 44' to form an articulated star member 42'. The articulated star member allows the pins to vary in their mutual angular relationship while remaining in a mutual, coplanar orientation. The star member may therefore be described as a planar-articulated star member. Each pin is equipped with rollers, and the rollers and the inner surfaces of the slots may have keyed curvate surfaces to keep the pins properly oriented in the joint.

In alternative embodiments of a three-slot universal joint according to the present invention, the slots on the ball member and socket member may all be straight slots, provided the shafts are not aligned or a mechanism such as a spring mechanism is incorporated to keep the pins in the equatorial position when associated slots become aligned during rotation.

Figure 5A:
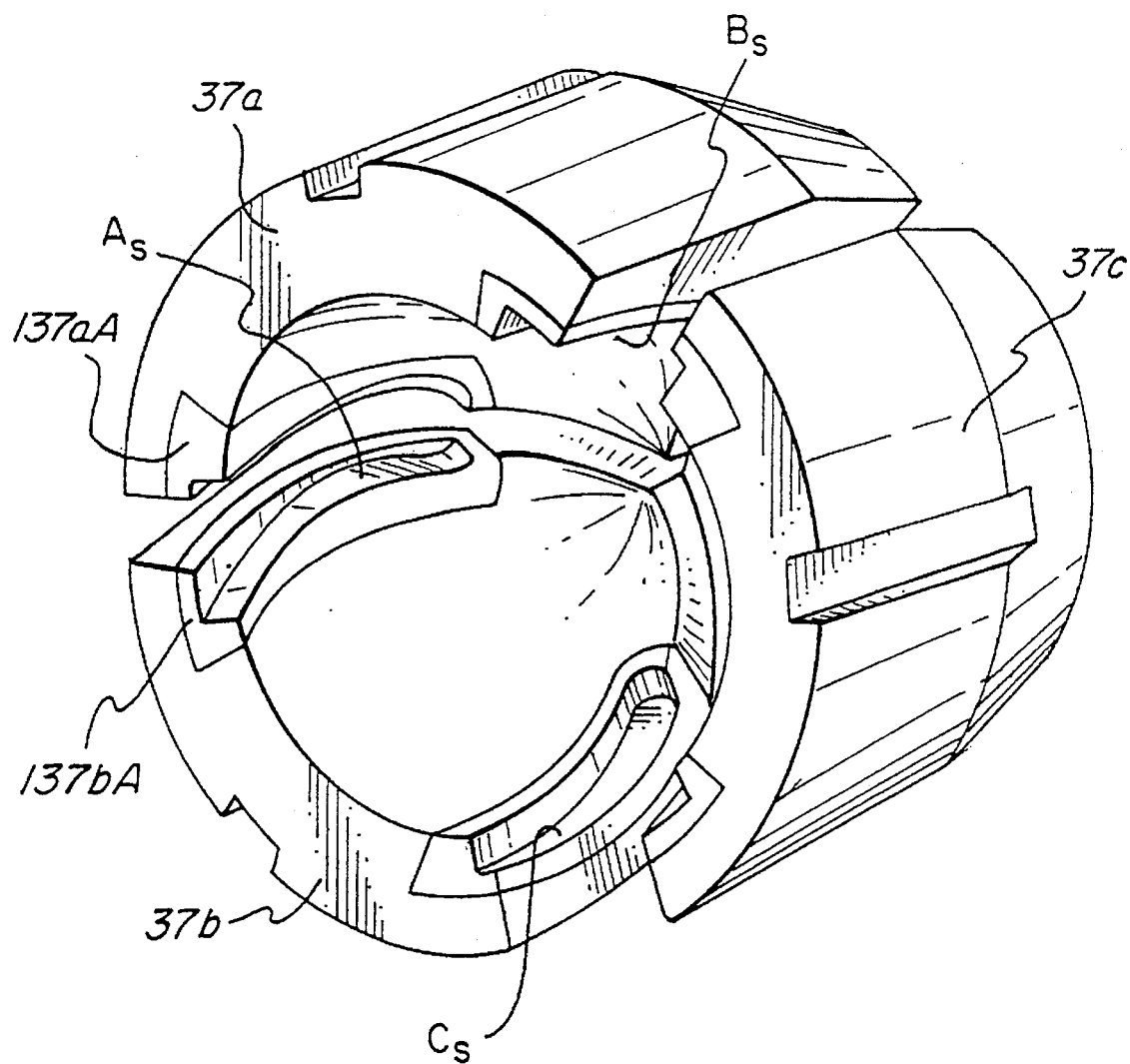
FIG. 5A is an exploded, perspective view of a plurality of sections comprising part of a socket member in accordance with another embodiment of the present invention.
Figure 5B:
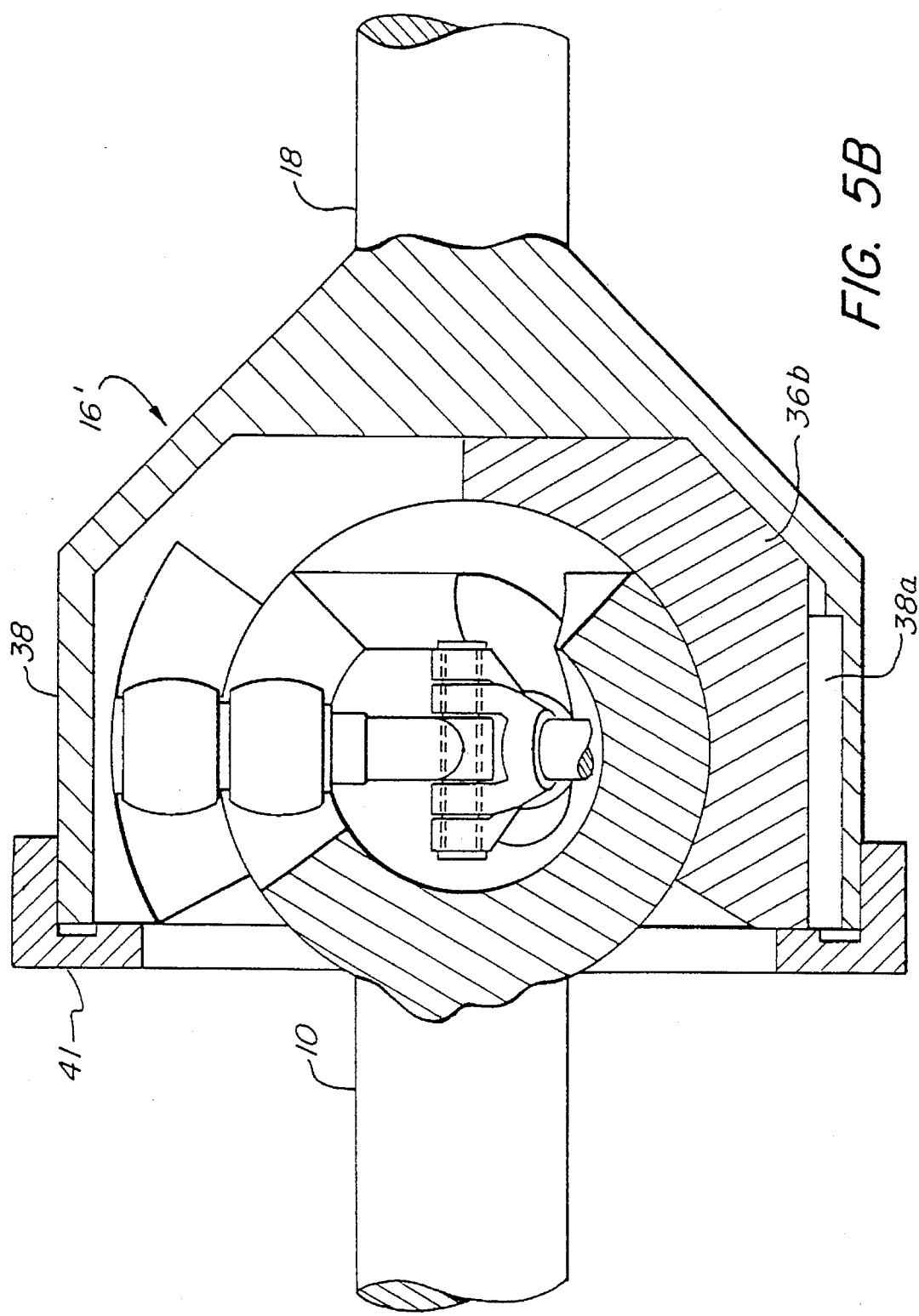
FIG. 5B is a cross-sectional view of a constant velocity universal joint comprising the socket member of FIG. 5A.

Optionally, the socket member may comprise a plurality of socket sections, each of which defines a portion of the substantially spherical concave sliding surface. A plurality of such socket sections, shown in the exploded perspective view of FIG. 5A, are disposed about a hollow ball member having pins protruding therefrom. The thus assembled socket sections 37a, 37b and 37c may be dimensioned and configured so that when they are assembled about a ball member they may be received and secured within a socket head 38 by retaining means, e.g., annular retaining ring 41 and key 38a as illustrated in FIG. 5B. Preferably, the socket sections are machined to have conveniently configured recesses for receiving inserts, e.g., inserts 137aA and 137bA, that have the socket slots, e.g., slot $A_S$, formed therein. The inserts may be made from, e.g., heat treated steel. The use of such inserts allows the use of less expensive and more easily machined material for forming the socket sections. The slots in the inserts may have the appropriate displacement angle.

While the invention has been described in detail with reference to particular embodiments thereof, and while certain features of the invention may have been illustrated in some embodiments and not in others, this is not intended as a limitation of the invention, and it will be apparent upon a reading and understanding of the foregoing that numerous alterations through the described embodiments will occur to those skilled in art, and it is intended to include such alterations within the scope of the appended claims.

What is claimed is:

1. A constant velocity universal joint comprising:

a first shaft having a longitudinal first shaft axis;

a ball member, defining a substantially spherical convex ball surface, fixedly mounted on the end of the shaft so that the center of the ball member is substantially aligned with the first shaft axis, and the ball surface having (i) an imaginary ball shaft pole where the ball member is mounted on the shaft; (ii) an imaginary ball end pole diametrically opposite to the ball shaft pole, and (iii) an imaginary circumferential equator line equidistant at all points from the ball shaft pole and the ball end pole, the ball member defining at least two ball slots at the convex ball surface, the at least two ball slots being disposed along imaginary great circles on the ball surface, each great circle having a point of intersection with the equator line, the great circles being displaced to equal degrees and in like directions at their respective points of intersection with respect to meridians passing through their respective points of intersection;

the ball member being disposed in a socket member dimensioned and configured to receive the ball member therein;

a second shaft having a longitudinal second shaft axis;

the socket member defining a substantially spherical concave socket surface and being fixedly mounted on the end of the second shaft so that the center of the socket member is substantially aligned with the second shaft axis, the socket surface having (i) an imaginary socket shaft pole where the socket member is attached to the second shaft, (ii) an imaginary socket end pole at a point diametrically opposite to the shaft pole, and (iii) an imaginary circumferential equator line equidistant at all points from the socket shaft pole and the socket end pole, the socket member defining at least two socket slots at the concave socket surface, the at least two socket slots being disposed along imaginary great circles on the socket surface, each great circle having a point of intersection with the equator line, the great circles being displaced to equal degrees and in like directions at their respective points of intersection with respect to the meridians passing through their respective points of intersection, the like directions being opposite of the direction of displacement of the ball slot great circles;

each ball slot being associated with a socket slot to define a pin passageway; and coplanar torque pin means comprising a torque pin extending into each pin passageway for transferring rotational motion from one of the ball member and the socket member to the other and for keeping the pins in mutual coplanar relation to one another and for allowing pins to move towards each other from diametrically opposite positions.

2. The universal joint of claim 1 wherein the great circles along which the ball slots and socket slots are disposed are situated symmetrically about their respective surfaces so that their intersection points with their respective equator lines are spaced along the equator lines at regular intervals.

3. The universal joint of claim 2 wherein the socket slots are open slots and the coplanar torque pin means comprises torque pins that extend from the ball slots through and beyond the socket slots, and wherein the coplanar torque pin means further comprises (i) a girdle member surrounding the socket member and defining a track, the girdle member being pivotably attached to the socket member at points defining a girdle pivot axis disposed perpendicular to the second shaft axis and substantially mid-way between the socket slots, and (ii) slide blocks slidably disposed in the track and on the surface of the socket member for receiving the pins, the girdle member and slide blocks constraining the pins to remain in mutual coplanar relation with each other.

4. The universal joint of claim 2 wherein the ball member defines three slots on the ball surface and the socket member defines three slots on the socket surface.

5. The universal joint of claim 4 wherein the ball member is hollow, wherein the ball slots are open slots, and wherein the coplanar torque pin means comprises three pins hingedly interconnected within the ball member to form a planar-articulated star member that keeps the pins in mutual coplanar relation with each other.

6. The universal joint of claim 2 wherein the ball member is hollow and the ball slots are open slots, the universal joint having two pin passageways, the coplanar torque pin means comprising a pair of hingedly interconnected pins rotatably mounted on stabilizer pins mounted in the ball member in a perpendicular orientation with respect to the first shaft axis and at points substantially mid-way between the ball slots.

7. The universal joint of claim 6 wherein the socket member comprises a plurality of socket sections, each socket section comprising a section of the concave spherical surface, the socket member further comprising a socket head attached to the shaft and dimensioned and configured to receive the socket sections and means for securing the socket sections in the socket head.

\* \* \* \* \*